3,497,352
PROCESS FOR THE PHOTOCHEMICAL CROSS-
LINKING OF POLYMERS
Gerard Albert Delzenne, Wilrijk, Belgium, and Otto Dann,
Erlangen, Hans Ulrich, Leverkusen, and Justus Dan-
hauser, Cologne-Stammheim, Germany, assignors to
Gevaert-Agfa N.V., Mortsel, Belgium, a Belgian
company
No Drawing. Filed Jan. 24, 1967, Ser. No. 611,263
Claims priority, application Germany, Feb. 1, 1966,
A 51,476
Int. Cl. G03c 5/00, 1/68; G03f 7/00
U.S. Cl. 96—35.1                           12 Claims

ABSTRACT OF THE DISCLOSURE

A process for the photochemical cross-linking of polymers carrying benzo[b]thiophen-1,1-dioxide substituents, to the production of printing plates and resist images, and to printing plates and resist images obtained by this process.

---

According to the invention a curable polymeric composition is provided which is capable of forming a cross-linked tridimensional structure on exposure to light, which polymeric composition comprises a light-sensitive polymeric material carrying benzo[b]thiophen-1,1-dioxide substituents.

Suitable light-sensitive polymers for the layers according to the invention are characterized, by a content of structural units of the following formulae:

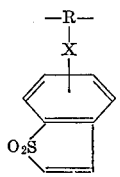

or

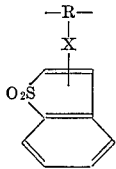

wherein:

R represents any unit of the polymeric chain, and
X represents any bridging radical, by means of which the benzo[b]thiophen-1,1-dioxide is linked to the polymeric chain.

Any synthetic or natural polymer is suited as fundamental substance for the light-sensitive polymer.

The sole limitation to the polymeric starting material is that its polymeric chain or side-chains contain reactive groups which can react with benzo[b]thiophen-1,1-dioxide compounds. These reactive groups are, e.g., anhydride, hydroxyl, amino or thiol groups.

The bridging radical X too has no fundamental influence upon the activity of the layers according to the invention. Preferred suitable groups are e.g.: —CONH—, —OCONH—, —OOC—, —C$_6$H$_4$COO— and

—C$_6$H$_4$NHCOO—

The phenyl nucleus of the benzo[b]thiophen-1,1-dioxide grouping can be substituted by any group, e.g. a halogen atom such as a chlorine or bromine atom, an alkyl or alkoxy group comprising at most 5 carbon atoms, or a nitro group. Especially suited are benzo[b]thiophen-1,1-dioxides which contain a phenyl group in 2-position. When the polymer possesses anhydride groups distributed over its polymer chain as is the case in a copolymer of styrene and maleic anhydride or in any other copolymer containing maleic anhydride units or homologous units of an anhydride of an ethylenically unsaturated dicarboxylic acid, the polymer can be made to react with a benzo[b]thiophen-1,1-dioxide which is substituted with an amino group. An example of such a compound is 5-amino-benzo[b]thiophen-1,1-dioxide.

When the polymeric material carries hydroxyl, thiol or amino groups, it may be made to react with a benzo[b]thiophen-1,1-dioxide substituted with a chlorosulphonyl, a chlorocarbonyl or an isocyanato group. These polymeric materials may be natural polymers, chemically modified natural polymers, synthetic polymerization-, polycondensation- or polyaddition products, which possess in their structure a substantial amount of reactive hydrogen atoms belonging to free anhydride, hydroxyl, thiol or amino groups. Polymeric materials consisting of about 10 to 98% of structural units bearing active hydrogen atoms have been found to be best suited.

Among the natural polymers may be mentioned cellulose, starch and dextrin. Suitable chemically modified natural polymers are the partial esters and ethers of the above mentioned natural polymers in which still a number of free hydroxyl groups is available for reaction with the chlorosulphonyl or chlorocarbonyl-substituted benzo[b]thiophen-1,1-dioxide, such as partially esterified or etherified cellulose and starch.

Synthetic polymerization products, which can react with a benzo[b]thiophen-1,1-dioxide carrying a chlorosulphonyl, a chlorocarbonyl or an isocyanato group are, e.g., poly(vinyl alcohol), partly acetalised or esterified poly(vinyl alcohol), and copolymers comprising in their structure a substantial amount of vinyl alcohol units. If the synthetic polymerization product is a copolymer, the comonomer or comonomers may be chosen among styrene and its derivatives substituted on the nucleus, ethylene, propylene, butylene, vinyl chloride, vinylidene chloride, vinyl esters and vinyl ethers, acrylic and methacrylic acids and their esters, e.g. with aliphatic alcohols possessing up to 5 carbon atoms, acrylonitrile and methacrylonitrile, butadiene and isoprene. These comonomers are worked up into the synthetic polymeric material in order to confer to the copolymers a maximum of strength and hardness after subsequent exposure to light and cross-linking.

In the same way the copolymer containing free hydroxyl groups may also comprise a certain amount of monomeric units possessing more than one ethylenically unsaturated bond, such as divinylbenzene, diglycol diacrylates, N,N'-alkylene-bisacryl amides and -methacrylamides, N,N-diallylacrylamide, N-allyl- and N-methallylacrylamide, ethylene diacrylate and triallyl cyanurate.

Synthetic condensation products carrying free hydroxyl groups are for instance polyesters of polybasic alcohols, polyurethanes comprising free hydroxyl groups, polyamides carrying hydroxymethyl or hydroxyethyl substituents and epoxy resins such as the polyether obtained by polycondensation of 2,2 - bis(4 - hydroxyphenyl)-propane and epichlorhydrin.

The above-mentioned natural and synthetic polymeric materials are reactive with benzo[b]thiophen-1,1-dioxides substituted with a chlorosulphonyl or chlorocarbonyl group for they all possess free hydroxyl groups in their polymeric structure.

Natural and synthetic polymeric materials containing free amino groups can also be made to react with the chloro-sulphonyl- or chlorocarbonyl-substituted benzo[b]thiophen-1,1-dioxides. Among these polymeric materials can be mentioned, e.g., gelatin, poly(vinylamine), poly(aminostyrene), and polyesters bearing free amino substituents along the main polymeric chain.

Polymeric materials comprising thiol groups, e.g., thiolated gelatin, poly(thiolstyrene), poly(vinylmercaptan), and the condensation product of poly(isophthalylidene-hexamethylenediamine) and thioglycolic acid as described in Example 5 of the Belgian patent specification 622,556 are useful too.

Preferably the reaction partners should have an average molecular weight of more than 1000. The average molecular weight that is best suited for each particular case can be easily determined by carrying out the usual tests. The optimal range of molecular weights, of course, also depends upon the nature of the polymer. In the case of polycondensation products generally those products will be appropriate, which have a relatively low molecular weight of approximately 1,000–10,000. In the case of polymerization products in the more narrow sense, particularly polymerized vinyl compounds, products having a molecular weight between 10,000 and approximately 500,000 will be appropriate for the most purposes. Polymers of that kind having a molecular weight between about 15,000 and 250,000 are preferred.

Under the influence of light the benzo[b]thiophen-1,1-dioxide substituents of the polymeric materials probably dimerize, thereby cross-linking the polymeric material to an insoluble substance with a tridimensional structure. Of course, the benzo[b]thiophen-1,1-dioxide substituents have to be present in an amount, which is sufficient for the desired degree of cross-linking. Good results are obtained when about 10 to 50%, preferably about 12 to 20%, of the recurring units of the polymeric material are substituted with benzo[b]thiophen-1,1-dioxide groups.

Cross-linking of the light-sensitive polymeric composition can be effected to some extent by simply exposing the light-sensitive polymeric composition to actinic light rays. However, in order to obtain the optimum degree of insolubilization as well as a faster reaction, it is preferred to effect the reaction in the presence of catalytic amount of one or more activators. Examples of suitable activators are p - dimethylamino - acetophenone, p - dimethylamino-benzophenone, p-nitrophenol, o,o'-dichloro-p-nitroaniline and anthraquinone.

By a polymeric composition carrying benzo[b]thiophen-1,1-dioxide groups there is meant in the following description and claims any polymer carrying benzo[b]thiophen-1,1-dioxide substituents. In addition the light-sensitive composition may comprise other polymers, activating agents, plasticizers, extenders and the like.

The polymeric materials may be exposed to actinic light from any source and of any type. The light source should preferably furnish an effective amount of ultra-violet radiation. Suitable light sources include carbon arcs, mercury vapour lamps, fluorescent lamps, argon glow lamps, photographic flood lamps and tungsten lamps.

For initiating the photochemical cross-linking a very strong light source is not required. Indeed, in most examples described hereinafter an 80 watt mercury vapour lamp is used. Brighter light sources are generally not needed since at these relatively low light intensities the photochemical cross-linking tendency of the benzo[b]-thiophen-1,1-dioxide groups has been found to be strong enough.

In the photochemical insolubilisation of light-sensitive polymeric compositions comprising benzo[b]thiophen-1,1-dioxide groups, high temperatures are not needed.

It has been found that polymeric compositions comprising benzo[b]thiophen-1,1-dioxide groups are light-sensitive in the sense that their exposure to light causes them to be cross-linked to a tridimensional, insoluble state. Thus, if a layer of one of such initially soluble light-sensitive polymeric compositions is applied to a support and exposed photographically, the exposed areas become insoluble.

The invention is valuable in forming plates and films wholly made of the light-sensitive polymeric composition. The light-sensitive compositions can also be used in the formation of coated printing films on any base by deposition according to any known process of films or coatings of the light-sensitive polymeric composition. Suitable bases are metal sheets (e.g. copper, aluminium, zinc, magnesium, etc.), paper, glass, cellulose ester film, poly(vinyl acetal) film, poly(styrene) film, poly(ethylene terephthalate) film, polycarbonate film. For screen-printing, nets of metal, e.g. of bronze and steel, as well as of polyamides such as nylon fabrics, are well suited.

The base or support can be coated with a solution of the light-sensitive polymeric composition in a suitable solvent. The solvent or solvent mixture is then eliminated by known means such as evaporation, thus leaving a more or less thin coating of the light-sensitive polymeric composition upon the base or support. The light-sensitive coating is then ready for exposure to actinic light rays.

When a base or support is used which is light-reflecting, there may be present, e.g. superposed on said base or support and adherent thereto or in the surface thereof, a layer or stratum absorptive of actinic light so as to minimize reflectance from the support of incident actinic light.

If the light-sensitive polymeric composition is soluble in water, this may be used as a solvent for coating the support. If use is made of light-sensitive polymeric compositions, which are insoluble in water, organic solvents, mixtures of organic solvents, or mixtures of organic solvents and water may be used.

Plates formed wholly of or coated with the light-sensitive polymeric compositions are useful in photography, photomechanical reproduction, lithography and intaglio printing. More specific examples of such uses are offset printing, silk-screen printing, duplicating pads, manifold stencil sheeting coatings, lithographic plates, relief plates, and gravure plates. The term "printing plates" as used in the claims is inclusive of all of these and thus includes both flexible material (e.g., self-sustaining layers of the said composition or sheet-material comprising a layer of such composition on paper or other flexible backing) as well as rigid materials comprising a rigid backing.

A typical procedure according to the invention for preparing a printing plate is as follows: A layer of the light-sensitive composition forming a self-sustaining film or sheet or applied as a coating to a backing, usually of metal, is exposed to light through a contacting master pattern, e.g. a process positive or negative (consisting solely of opaque and transparent areas and where the opaque areas are of the same optical density, viz, the so-called line or half-tone negative or positive). The light induces the cross-linking reaction which insolubilises the areas of the surface beneath the transparent portions of the image, whereas the areas beneath the opaque portions of the image remain soluble. The soluble areas of the surface are then removed by a developer and the remaining insoluble raised portions of the film can serve as a resist image. Then the exposed base material is etched, which forms a relief plate, or the plate can be inked and used as a relief printing plate directly in the customary manner.

After washing away of the unexposed and thus soluble portions of the light-sensitive layer or film, the layer may be subjected, if desired, to other known hardening techniques. These hardening techniques depend, or course, upon the kind of light-sensitive polymer used. When e.g. the original polymer is an epoxy resin obtained by the reaction of 2,2 - bis(4 - hydroxyphenyl) - propane and epichlorhydrin, which epoxy resin has been modified with benzo[b]thiophen-1,1-dioxide substituents, the insolubilised polymer portions remaining after exposure and development may be hardened supplementarily according to hardening techniques known for epoxy resins.

The purpose of this additional hardening is to strengthen the insolubilised polymer parts as much as possible. If e.g. the remaining insolubilised polymer surface is to be used as a printing plate, a similar subsequent hardening is often desirable.

The thickness of the light-sensitive layer is a direct function of the thickness required in the relief image and will depend on the subject to be reproduced and particularly on the extent of the non-printing areas. In general, the thickness of the light-sensitive layer is suitable within the range 0.001 mm. to about 7 mm. Layers ranging from about 0.001 to about 0.70 mm. in thickness are in general suitable for halftone plates. Layers ranging from about 0.25 to about 1.50 mm. in thickness are in general suitable for the majority of letter-press printing plates.

If the light-sensitive polymeric composition is to be applied to a metal support, the polymeric material can very suitably be selected from poly(vinylbutyrals) and polyepoxy resins, the high adherence of which to metals is well known.

The solvent liquid used for washing or "developing" the printing plates made from the light-sensitive polymeric composition must be selected with care, since it should manifest good solvent action on the unexposed areas, yet have little action on the hardened image or upon any base material, antihalation layer, or subbing layer by which the light-sensitive polymeric composition may be anchored to the support.

The light-sensitive polymeric compositions of the present invention are suitable for other purposes in addition to the printing uses described above.

The surface of a film or layer of a somewhat sticky light-sensitive polymeric composition can be treated with a powder after image-wise exposure to light. The exposed areas are hardened and thereby loose their stickiness. As a consequence the powder is taken up only by the unexposed areas and the powder image thus formed can be used in transfer processes.

The light-sensitive polymeric compositions are suitable for other purposes as well, e.g., as ornamental plaques or for producing ornamental effects; as patterns for automatic engraving machines, foundry moulds, cutting and stamping dies, name stamps, relief maps for braille; as rapid cure coatings, e.g. on film base; as sound tracks on film; for embossing plates, paper, e.g. with a die prepared from the photosensitive compositions; in the preparation of printed circuits; and in the preparation of other plastic articles.

The light-sensitive polymeric substances of the invention can be utilised as ultra-violet curing catalysts for systems where low heat application is a requirement in the curing of a particular part, and sunlight or other sources of ultra-violet light are readily available.

For the preparation of the light-sensitive polymers to be used according to the invention the following compounds containing benzo[b]thiophen - 1,1 - dioxide groups are suited as starting products: 5-amine-benzo[b]thiophen-1,1 - dioxide; 2-(p-chlorocarbonylphenyl)-benzo[b]thiophen - 1,1-dioxide; 2-(p-isocyanatophenyl)-benzo[b]thiophen-1,1-dioxide.

These compounds are prepared as follows:

(1) 2-(p-chlorocarbonylphenyl)-benzo[b]thiophen-1,1-dioxide (a) 4'-bromo-2-phenylthioacetophenone.—To a solution of 14 g. of potassium hydroxide and 22 g. of thiophenol in 200 g. of methanol, a suspension of 55.6 g. of p-bromo-acetophenone in 500 cc.'s of methanol is added at 0° C. The solution is slowly heated to boiling point and then refluxed for one hour. The major part of methanol is distilled off, whereupon whilst cooling, colourless crystals are obtained. Melting point: 64–65° C.

(b) 2 - (p - bromophenyl)-benzo[b]thiophen.—Whilst stirring a solution of 61.5 g. of 4'-bromo-2-phenylthioacetophenone in 200 ccs. of chlorobenzene is added to a suspension of 67 g. of aluminum chloride in 200 ccs. of bromine chloride. Whilst further stirring, the mixture is heated for 2 hours at 90° C. After cooling, strong concentrated hydrochloric acid is added, whilst cooling, to the reaction product. The crude product is sucked off and recrystallized from glycol monomethyl ether. Melting point: 205° C.

(c) p-(2-benzo[b]thiophen)benzoic acid.—A mixture of 40 g. of 2-(p-bromophenyl)-benzo[b]thiophen and 40 g. of copper(I) cyanide are heated with 120 cc.'s of quinoline to boiling point. After two hours, the mixture is cooled and extracted several times with chloroform. After having removed the quinoline with dilute hydrochloric acid, the chloroform is distilled off, whereafter the residue is dissolved together with 17 g. of potassium hydroxide, in 500 cc.'s of glycol, and heated for 14 h. at boiling point. After cooling, the solution is poured into water and acidified with dilute sulphuric acid. The precipitated carboxylic acid is sucked off and recrystallized from glacial acetic acid. Melting point: 320° C.

(d) 2-(p-chlorocarbonylphenyl) - benzo[b]thiophen-1, 1-dioxide.—15 g. of p-(2-benzo[b]thiophen)-benzoic acid are heated for 20 minutes in 250 cc.'s of glacial acetic acid and 20 cc.'s of hydrogen peroxide (30%) until gently boiling. On cooling, yellow crystals are obtained which are carefully dried. The obtained product is heated for 2 h. on the water bath with about 200 cc.'s of thionyl chloride, whereupon the latter is distilled off in vacuo. The acid chloride can be recrystallized from chlorobenzene.

(2) 2-(p-isocyanato-phenyl)-benzo[b]thiophen-1,1-dioxide (a) 2-(p-nitrophenyl)-3-carboxy-benzo[b]thiophen.—25 g. of sodium hydroxide and 41 g. of benzo[b]thiophen-2,3-dione are dissolved in 400 cc.'s of 50% aqueous methanol. Whilst stirring, a solution of 42 g. of p-nitrobenzyl chloride in 200 cc.'s of methanol is added. Thereafter the mixture is diluted with water and acidified with strong hydrochloric acid. The product obtained is filtered off, dried and refluxed for 13 h. with 450 cc.'s of acetic anhydride and 12 cc.'s of piperidine. The reaction mixture is poured in water, so that 2-(p-nitrophenyl)-2-carboxy-benzo[b]thiophen precipitates, which is dissolved in aqueous sodium carbonate and again precipitated with dilute acid. Melting point: 240–250° C.

(b) 2-(p-nitrophenyl)-benzo[b]thiophen-1,1-dioxide.—40 g. of 2-(p-nitrophenyl-3-benzo[b]thiophen-carboxylic acid are slowly heated with 100 cc.'s of quinoline and 2 g. of copper powder. After the evolution of gas, the desired product is precipitated by adding aqueous hydrochloric acid. The dry precipitate is dissolved in 500 cc.'s of glacial acetic acid and to the solution obtained 100 cc.'s of hydrogen peroxide (30%) are added at boiling temperature. On cooling, yellow needles are obtained.

(c) 2 - (p - isocyanato-phenyl)-benzo[b]thiophen-1,1-dioxide.—A mixture consisting of 30 g. of 2-(p-nitrophenyl)-benzo[b]thiophen-1,1-dioxide, 200 mg. of glacial acetic acid, 240 g. of tin(II) chloride and 200 cc.'s of strong hydrochloric acid are refluxed for 30 minutes. On cooling, the amine precipitates in the form of its tin salt. By adding caustic soda, the free amine is obtained. The product is dried and dissolved in 300 cc's of xylene by heating. To this solution are added at 80° C. 400 cc.'s of xylene saturated with phosgene. After two hours, the phosgene is expelled with nitrogen and the solution is concentrated in vacuo. The isocyanate can be dissolved and reprecipitated in chlorobenzene or petroleum ether.

(3) 5-amino-benzo[b]thiophen-1,1-dioxide

The compound is prepared in the known way by nitration of o-chlorobenzaldehyde, conversion of the resulting product with sodium sulphide and sulphur, and by ring closure of the disulphite formed. This product is decarboxylated in the known way and the produced 5-nitro-benzo[b]thiophen is then converted with hydrogen peroxide into the corresponding derivative. Thereupon the nitro group is reduced to the amino group. Melting point: 178° C. The solution of the light-sensitive polymer, formed on converting the polymeric component with the thionaphthene dioxide compound generally can be used immediately for the manufacture of the light-sensitive layers.

The following examples illustrate the present invention.

EXAMPLE 1

A solution of 29.8 g. of 2-(p-isocyanatophenyl)-benzo[b]thiophene-1,1-dioxide in 150 cc.'s of cyclohexanone is added at 65° C. to a solution of 10 g. of partly saponified copoly(ethylene/vinyl acetate) (29/71 by weight), containing 0.104 mol of free hydroxyl groups, in 200 cc.'s of dry pyridine. The mixture is stirred for 3 h. at 60–65° C. The modified copolymer contains units of the following formula:

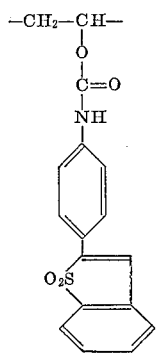

Thereafter, the pyridin is expelled by means of cyclohexanone. After addition of 0.4 g. of 1-methyl-2-benzoylmethylene-naphtho[1,2-d]thiazoline, a zinc plate is coated with this solution. The dried light-sensitive layer is now exposed through a line-negative and then developed with butyl acetate. A true negative reproduction of the original with sharp edges is obtained which can be used as printing plate.

EXAMPLE 2

To a solution of 10 g. of a saponified copoly(vinyl acetate/vinyl chloride) (42/58) containing 0.054 mole of free hydroxy groups in 200 cm.³ of dry pyridine is added a solution of 16.3 g. of 2-(p-chlorocarbonyl-phenyl)-benzo[b]thiophen-1,1-dioxide in 100 cc.'s of toluene. The mixture is stirred for 5 h. at 65° C. and then poured into methanol, whereupon the precipitated product is washed and dissolved in butyl acetate. The modified copolymer contains units of the following formula:

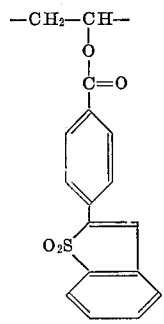

After sensitisation with 0.33 g. of Michler's ketone, a thin layer of this solution is applied to an aluminium plate. This material is exposed through a negative and developed in butyl acetate containing 0.05% of Ceres black BN (C.I. 26.150).

In this way a hydrophobic positive on hydrophilic ground is obtained, which can be used for offset printing.

EXAMPLE 3

20 g. of a polyether containing 0.063 mole of free hydroxyl groups and having been prepared from 2,2'-bis(4-hydroxyphenyl)-propane and epichlorhydrin with an average molecular weight of more than 10,000 are dissolved in 300 cc.'s of cyclohexanone and 50 cc.'s of pyridine. At 65° C. a solution of 18 g. of 2-(p-isocyanatophenyl)benzo[b]thiophen-1,1-dioxide in cyclohexanone is added. The mixture is stirred for 3 h. at 60 to 70° C. and the further procedure of Example 1 is followed.

EXAMPLE 4

To a solution of 10 g. of partly hydrolyzed cellulose acetate, containing 0.068 mole of free hydroxyl groups, in 150 cc.'s of dry pyridine, a solution is added of 20.6 g. of 2-(p-chlorocarboxy-p-phenyl)-benzo[b]thiophen-1,1-dioxide in 100 cc.'s of cyclohexane. The mixture is heated for 3 h at 60° C. and then poured into methanol. The polymer precipitated is dissolved in 150 cc.'s of butyl acetate and 150 cc.'s cyclohexanone, and sensitized with 300 mg. of Michler's ketone. This solution is applied to a copper-laminated plastic plate. The layer is thoroughly dried, exposed through the negative of a circuit scheme and developed with butyl acetate. The uncovered copper parts can be etched away with iron(III) chloride solution without affecting the exposed parts of the layer.

EXAMPLE 5

In a reaction flask provided with a reflux condensor and a calcium chloride tube are placed:

1 g. (0.005 mole) of copolymer of styrene and maleic anhydride 0.9 g. (0.005 mole) of 5-amino-benzo[b]thiophen-1,1-dioxide 20 cc.'s of pyridine.

This reaction mass is heated at 90° C. for 6 hours and then cooled. After having added 55 cc.'s of acetone, the reaction mass is poured into a mixture of 200 cc.'s of water and 100 cc.'s of strong hydrochloric acid. The precipitate formed is filtered by suction, washed with water, and dried under reduced pressure.

The obtained modified polymer possesses the following structure:

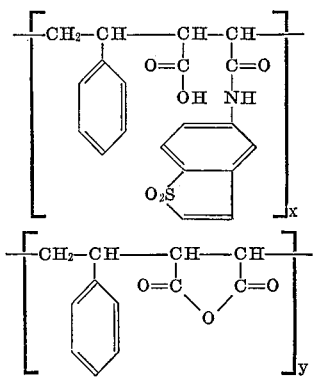

It has been found by analysis that $x=y=1$, so that half of the maleic anhydride units has been substituted.

25 mg. of this modified polymer are dissolved in a mixture of 1 cc. of dioxane and 2 cc.'s of acetone, whereupon the solution obtained is applied to an aluminium foil in such a way, that after the evaporation of the solvents a layer of about 1μ thickness is left. This layer is exposed to a line original by means of a high pressure mercury vapour lamp of 80 watt placed at a distance of 15 cm. Cross-linking takes place on the exposed areas of the polymer layer. The non-exposed areas, however, can be washed away with a mixture of dioxane and acetone (1:2). A relief image is left.

In order to obtain a good relief image an exposure time of 7 minutes 30 sec. sufficies.

EXAMPLES 6 TO 10

Example 5 is repeated, but the modified polymer is mixed each time with 2.5 mg. of activating agent as listed below. Exposure and development occur in the same way. The times necessary for obtaining good relief images are given in the following table.

| Example | Activating agent | Exposure time |
|---|---|---|
| 6 | p-Nitrophenol | 2'45" |
| 7 | p-Dimethylaminoacetophenone | 2'45" |
| 8 | p-Dimethylaminobenzophenone | 3'45" |
| 9 | o,o'-Dichloro-p-nitroaniline | 3'45" |
| 10 | Anthraquinone | 5'30" |

We claim:

1. A polymeric composition, which is capable of forming a cross-linked substance having a tridimensional structure by exposure to light, which polymeric composition comprises a light-sensitive polymeric material carrying benzo[b]thiophen-1,1-dioxide substituents.

2. A polymeric composition according to claim 1, wherein the polymeric composition comprises the reaction product of a polymer possessing reactive hydrogen atoms belonging to free anhydride groups, hydroxyl groups, amino groups or thiol groups with a benzo[b]-thiophen-1,1-dioxide substituted by a chlorocarbonyl, a chlorosulphonyl or an isocyanato group.

3. A composition according to claim 1, wherein the polymeric composition comprises the reaction product of a partly hydrolysed copolymer of ethylene and vinyl acetate with 2-(p-isocyanatophenyl)-benzo[b]thiophen-1,1-dioxide.

4. A composition according to claim 1, wherein the polymeric composition comprises the reaction product of a partly hydrolysted copolymer of vinyl chloride and vinyl acetate with 2-(p-isocyanatophenyl)-benzo[b]-thiophen-1,1-dioxide.

5. A composition according to claim 1, wherein the polymeric composition comprises the reaction product of the polyether of 2,2-bis(4-hydroxyphenyl)-propane and epichlorohydrin with 2-(p-isocyanatophenyl)-benzo[b]-thiophen-1,1-dioxide.

6. A composition according to claim 1, wherein the polymeric composition comprises the reaction product of partly hydrolysted celluloseacetate with 2-(p-carboxyphenyl)-benzo[b]thiophen-1,1-dioxide.

7. A polymeric composition according to claim 1, wherein the polymeric composition comprises the reaction product of a copolymer of styrene and maleic anhydride with 5-amino-benzo[b]thiophen-1,1-dioxide.

8. A polymeric composition according to claim 1, wherein an activating agent is added to the polymeric material.

9. A polymeric composition according to claim 8, wherein the activated agent is selected from p-dimethylaminoacetophenone, p-dimethylamino-benzophenone, p-nitrophenol, o,o'-dichloro-p-nitroaniline, and anthraquinone.

10. Copying material for use in the photochemical preparation of printing plates, which comprises a support having thereon a light-sensitive coating comprising a polymeric composition according to claim 1.

11. A process for the photochemical preparation of a printing plate, which comprises exposing to actinic light under a master pattern a copying material as outlined in claim 10 and developing the resulting image of the master pattern by dissolving away the non-exposed portions of the coating.

12. A process as outlined in claim 11, including the step of etching the developed plate in order to produce a relief printing plate.

References Cited

UNITED STATES PATENTS 2,870,011   1/1959   Robertson et al. __ 96—115 XR

NORMAN G. TORCHIN, Primary Examiner

R. H. SMITH, Assistant Examiner

U.S. Cl. X.R.

96—115; 260—79